Figure 1:
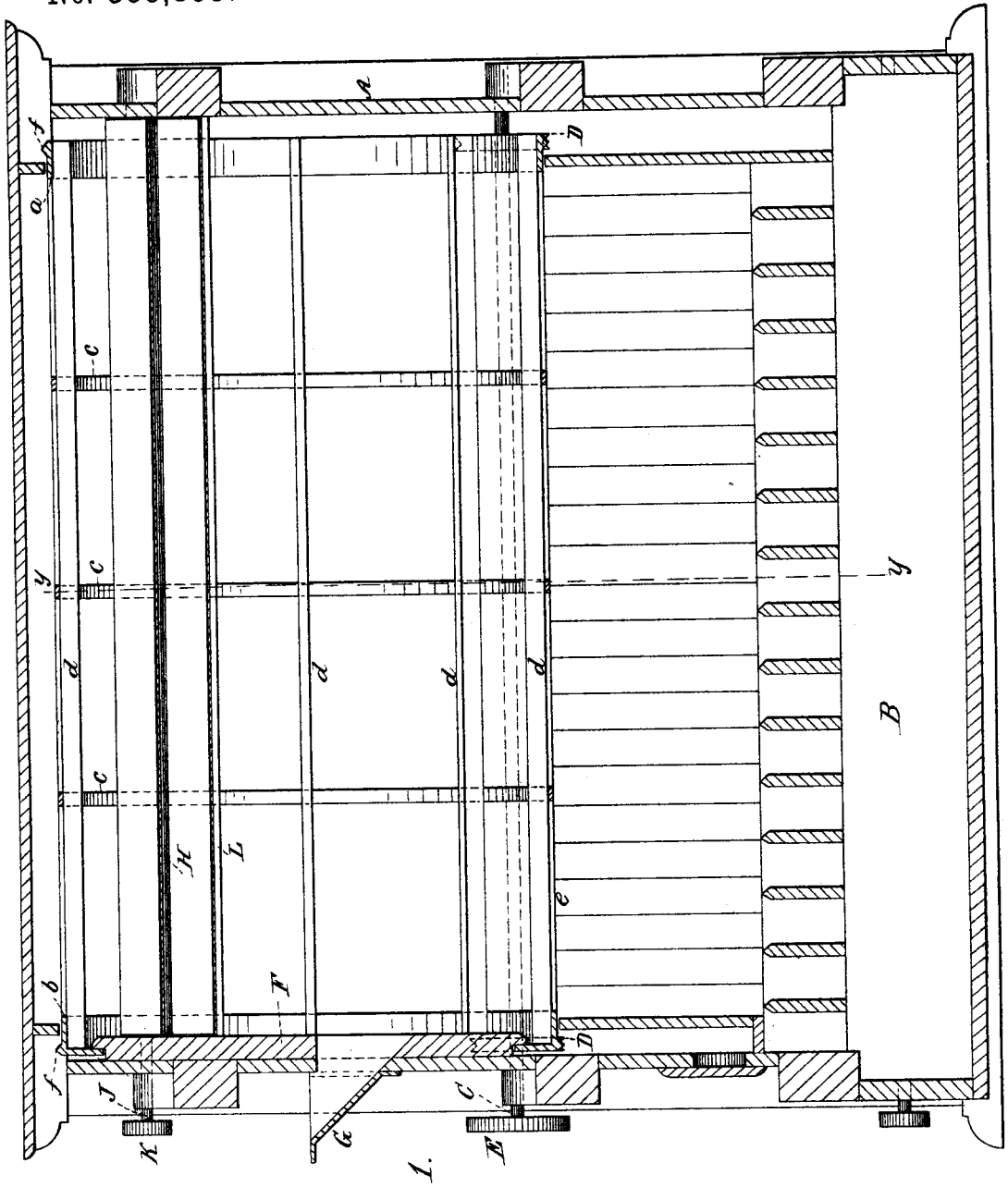

(No Model.) 2 Sheets—Sheet 1.
H. J. GILBERT.
FLOUR BOLT.

No. 388,855. Patented Sept. 4, 1888.

Witnesses:
W. C. Jirdinston.
E. W. Rector.

Inventor:
Henry J. Gilbert,
by Stem Beck.
his Attorneys.

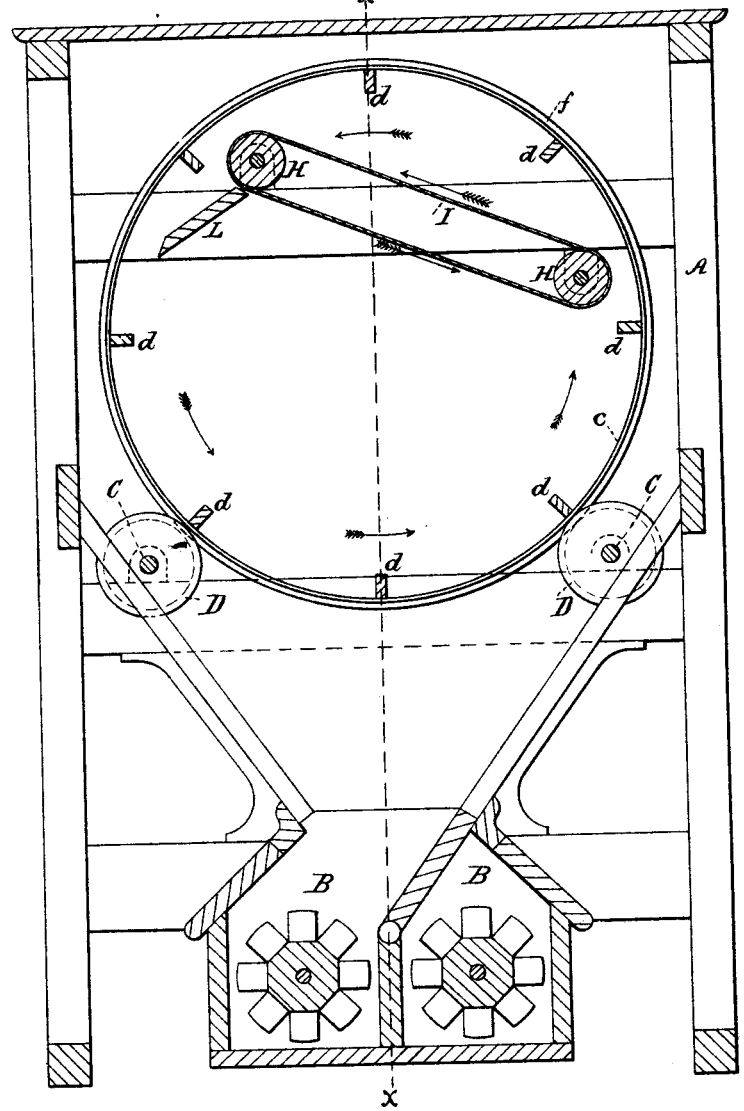

UNITED STATES PATENT OFFICE.

HENRY J. GILBERT, OF DAYTON, OHIO.

FLOUR-BOLT.

SPECIFICATION forming part of Letters Patent No. 388,855, dated September 4, 1888.

Application filed December 27, 1886. Serial No. 222,682. (No model.)

*To all whom it may concern:*

Be it known that I, HENRY J. GILBERT, a citizen of the United States, residing at Dayton, in the county of Montgomery and State of Ohio, have invented certain new and useful Improvements in Flour-Bolts, of which the following is a full, clear, and exact description, reference being had to the accompanying drawings, forming part of this specification.

My invention relates to that class of flour-bolts having revolving reels whose axes are slightly inclined, which reels are covered by bolting-cloth of any desired size of mesh, and into which the flour is introduced at one end and the tailings delivered out at the opposite or lower end.

The object of my invention is to increase the efficiency of this class of flour-bolts by providing an internal carrier fitted into the upper part of the reel and arranged to carry the stock across from the ascending to the descending side of the same, whereby an increased amount of bolting-surface is utilized.

The novelty of my invention will be herein set forth, and specifically pointed out in the claims.

In the accompanying drawings, Figure 1 is a sectional longitudinal elevation of my improved bolt, taken through the line $x\ x$ of Fig. 2. Fig. 2 is a sectional end elevation of the same through the line $y\ y$ of Fig. 1.

The same letters of reference are used to indicate identical parts in both the figures.

A is the usual bolting-chest, of any suitable construction, opening into the conveyer-boxes B, as is usual in this class of bolts.

The reel is constructed of two end rings, $a\ b$, and intermediate rings, $c$. All of these rings are connected and supported in place by cross-ribs $d$, of which in the present instance eight are shown, though the number may be greater or less. This construction forms a cylindrical frame, upon which the bolting-cloth $e$ is stretched and secured. The reel is supported and revolved in the chest in the following manner:

C C are two shafts suitably journaled in and extending the length of the chest on each side. Upon these shafts, just within the ends of the chest, are keyed or otherwise secured circumferentially-grooved wheels or rollers D, into the grooves of which ribs $f$ upon the rings $a\ b$ fit. The shafts C C project through either end of the chest and are provided with pulleys E, connected by belting and revolved in the same direction by power from other pulleys. (Not here shown.) In this manner it will be observed that the reel is supported upon and revolved by the wheels D. The ring $b$ is provided with a right-angled flange, which fits behind a shoulder or offset upon a head-piece, F, secured to the inner side of the chest, as seen in Fig. 1.

G is the usual inlet or feeding chute.

Suitably journaled within the chest and extending within and the entire length of the reel in its upper part are two rollers, H, around which is passed an endless apron or belt, I, of a width equal to the entire length of the reel. One of these rollers, in this instance the upper one, is provided with a projecting shaft, J, upon which is a pulley, K, driven in any suitable manner to cause the revolution of the rollers H and the travel of the apron or belt I in the direction indicated by the arrows.

It will be seen from this construction that the flour carried up on the ascending side of the reel will be delivered upon the belt or apron I and carried across and discharged upon the descending side of the reel, thereby utilizing a very large portion of the bolting-surface of the reel.

In the present instance I have shown an inclined delivering-surface in the form of an apron or board, L, upon which the flour is delivered from the revolving apron, and which discharges the same upon the descending side of the reel, though, if desired, this board may be dispensed with.

While the revolving carrier has been shown inclined, it is evident that it might be substantially horizontal.

Having thus fully described my invention, I claim—

1. In a flour-bolt, the combination, with the bolting-reel, of an internal revolving apron or belt arranged therein for delivering the stock across the reel from the ascending to the descending side thereof, substantially as described.

2. In a flour-bolt, the combination, with the bolting reel, of elevating devices for carrying the material up the ascending side of the reel and an internal revolving apron or belt for receiving the material on the ascending side and transferring it to the descending side of the reel, substantially as described.

3. In a flour-bolt, the combination, with the bolting-reel provided with longitudinal elevating-ribs, of an internal revolving apron or belt arranged therein for delivering the stock across the reel from the ascending to the descending side thereof, substantially as described.

4. In a flour bolt, the combination, with the bolting-reel, of an internal revolving apron or belt arranged therein for carrying the stock across the reel from the ascending to the descending side thereof and an inclined delivering-surface for delivering the stock upon the descending side of the reel, substantially as described.

5. In a flour-bolt, the combination, with the reel, of the elevating-ribs *d*, rollers H, endless belt or apron I, and inclined board L, substantially as and for the purpose described.

6. The combination of a reel, means for elevating the material inside the reel, an endless belt for carrying the material toward the descending side of the reel, and an inclined delivering-surface for receiving the material from the belt and delivering it to the descending side of the reel, substantially as described.

HENRY J. GILBERT.

Witnesses:
E. W. RECTOR,
G. F. HEIDMAN.